(12) United States Patent
Ye et al.

(10) Patent No.: US 9,854,181 B2
(45) Date of Patent: Dec. 26, 2017

(54) IMAGE PROCESSING METHOD AND APPARATUS AND TERMINAL DEVICE TO OBTAIN A GROUP PHOTO INCLUDING PHOTOGRAPHER

(71) Applicant: Tencent Technology (Shenzhen) Company Limited, Shenzhen (CN)

(72) Inventors: Yinghua Ye, Shenzhen (CN); Na Shao, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 21 days.

(21) Appl. No.: 14/818,730

(22) Filed: Aug. 5, 2015

(65) Prior Publication Data

US 2015/0341567 A1  Nov. 26, 2015

Related U.S. Application Data (63) Continuation of application No. PCT/CN2014/083518, filed on Aug. 1, 2014.

(30) Foreign Application Priority Data

Aug. 6, 2013  (CN) .......................... 2013 1 0339223

(51) Int. Cl.
*H04N 5/265* (2006.01)
*G06K 9/62* (2006.01)
(Continued)

(52) U.S. Cl.
CPC ........... *H04N 5/265* (2013.01); *G06K 9/6201* (2013.01); *H04N 1/3871* (2013.01);
(Continued)

(58) Field of Classification Search
CPC .. H04N 5/265; H04N 5/23293; H04N 5/2621; H04N 5/2628; H04N 5/272; H04N 1/3871; H04N 1/3876; G06K 9/6201
See application file for complete search history.

(56) References Cited

U.S. PATENT DOCUMENTS 6,300,955 B1 * 10/2001 Zamir .................... G06T 7/194
345/563
7,423,671 B2 * 9/2008 Kiso ...................... H04N 1/387
348/218.1

(Continued)

FOREIGN PATENT DOCUMENTS

| CN | 1066514 A | 11/1992 |
|---|---|---|
| CN | 101651767 A | 2/2010 |
| CN | 102665026 A | 9/2012 |

OTHER PUBLICATIONS

Tencent Technology, ISRWO, PCT/CN2014/083518, Nov. 20, 2014, 7 pgs.

(Continued)

*Primary Examiner* — Luong T Nguyen
(74) *Attorney, Agent, or Firm* — Morgan, Lewis & Bockius LLP (57) ABSTRACT

A method is disclosed, for performing image processing at a client device, including taking a first photograph comprising a first subject and a first background. The method further includes processing the first photograph to generate a first processed photograph comprising a modified first subject and a modified first background, and aligning the first processed photograph through the display of the client device until a second background shown on the display matches the modified first background. The method further includes taking a second photograph with the first processed photograph aligned in the display of the client device, wherein the second photograph comprises a second subject (Continued)

and the second background, and combining the first photograph and the second photograph to create a third photograph, wherein the third photograph comprises the first subject, the second subject and the first background.

16 Claims, 10 Drawing Sheets

(51) Int. Cl.
    *H04N 5/272* (2006.01)
    *H04N 5/232* (2006.01)
    *H04N 5/262* (2006.01)
    *H04N 1/387* (2006.01)

(52) U.S. Cl.
    CPC ....... *H04N 1/3876* (2013.01); *H04N 5/23293* (2013.01); *H04N 5/2621* (2013.01); *H04N 5/2628* (2013.01); *H04N 5/272* (2013.01)

(56) References Cited

U.S. PATENT DOCUMENTS

| | | | |
|---|---|---|---|
| 2005/0078202 | A1 | 4/2005 | Kiso |
| 2005/0168594 | A1* | 8/2005 | Larson ............... G06T 3/4038 348/222.1 |
| 2009/0073507 | A1* | 3/2009 | Fukuda ............. H04N 1/00795 358/474 |
| 2010/0310161 | A1* | 12/2010 | Horovitz ............. H04N 1/6033 382/165 |
| 2013/0038623 | A1* | 2/2013 | Tezuka ............... G06F 3/04886 345/589 |

OTHER PUBLICATIONS

Tencent Technology, IPRP, PCT/CN2014/083518, Feb. 9, 2016, 5 pgs.

* cited by examiner

IMAGE PROCESSING METHOD AND APPARATUS AND TERMINAL DEVICE TO OBTAIN A GROUP PHOTO INCLUDING PHOTOGRAPHER

RELATED APPLICATIONS

This application is a continuation application of PCT Patent Application No. PCT/CN2014/083518, entitled "IMAGE PROCESSING METHOD AND APPARATUS AND TERMINAL DEVICE" filed on Aug. 1, 2014, which claims priority to Chinese Patent Application No. 201310339223.6, "IMAGE PROCESSING METHOD AND APPARATUS AND TERMINAL DEVICE," filed on Aug. 6, 2013, both of which are hereby incorporated by reference in their entirety.

TECHNICAL FIELD

The present disclosure relates to the field of Internet technologies, and in particular to an image processing method and apparatus and a terminal device.

BACKGROUND

A group photo including everyone usually needs to be obtained in outdoor travel, parties with friends or daily lives. However, during the use of a mobile phone camera and a traditional camera, it is always a big trouble to include a photographer in a group photo. To obtain a group photo including everyone, a photographer usually obtains an image including everyone except the photographer by using a mobile phone camera or a traditional camera, another person then obtains an image of the photographer by using the mobile phone camera or the traditional camera, and subsequently the photographer manually makes a simple combination of the two images on a PC to obtain the group photo including everyone. However, it is found in practice that not only such a manual manner of obtaining a group photo including everyone is complicated to process, but also a simple combination of images results in stiffness in the group photo.

SUMMARY

The above deficiencies and other problems associated with taking group photographs are addressed by the techniques disclosed herein. In some embodiments, the method for image processing is implemented on a client device that has a camera, a display, one or more processors, memory and one or more modules, programs or sets of instructions stored in the memory for performing multiple functions. Instructions for performing these functions may be included in a computer program product configured for execution by one or more processors.

In one aspect, a computer-implemented method for performing image processing at a client device includes taking a first photograph comprising a first subject and a first background. The method further includes processing the first photograph to generate a first processed photograph comprising a modified first subject and a modified first background, and aligning the first processed photograph through the display of the client device until a second background shown on the display matches the modified first background. The method further includes taking a second photograph with the first processed photograph aligned in the display of the client device, wherein the second photograph comprises a second subject and the second background, and combining the first photograph and the second photograph to create a third photograph, wherein the third photograph comprises the first subject, the second subject and the first background.

In another aspect, a client device for performing image processing includes a camera, display and memory, one or more processors, and one or more programs stored in the memory and configured for execution by the one or more processors to perform the methods described herein.

In another aspect, a non-transitory computer readable storage medium stores one or more programs, the one or more programs comprising instructions, which when executed by a server, cause the server to perform the method described herein.

Various advantages of the disclosed technology would be apparent in light of the descriptions below.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

To illustrate the technical solutions according to the embodiments of the present disclosure more clearly, the accompanying drawings needed for the embodiments are introduced briefly in the following. Apparently, the accompanying drawings in the following description are only some embodiments of the present disclosure, and persons of ordinary skill in the art can derive other drawings from the accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solution of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

An embodiment of the present disclosure discloses an image processing method and apparatus and a terminal device, so as to conveniently obtain a group photo including everyone, and further make the group photo more natural. The detailed illustration is provided below.

Figure 1:
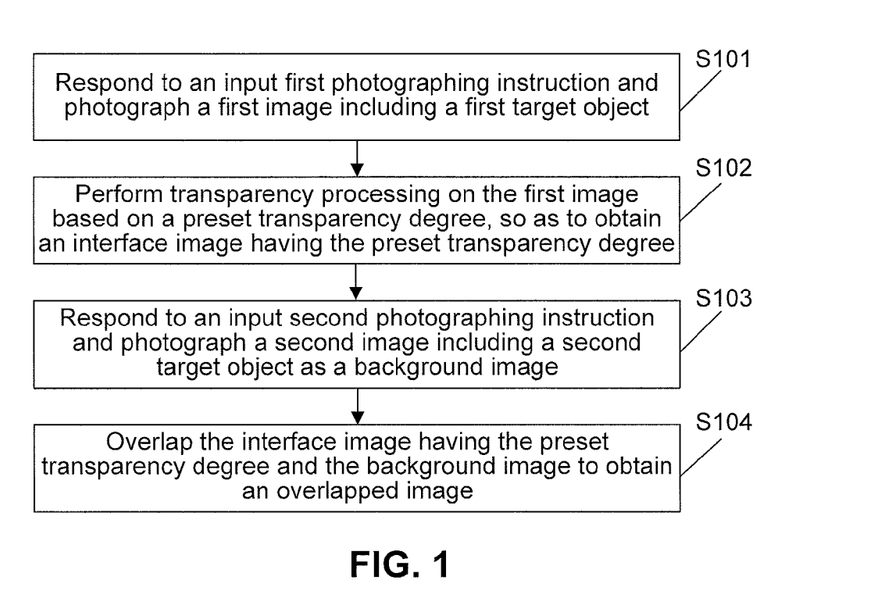
FIG. 1 is a flow chart of an image processing method disclosed by an embodiment of the present disclosure.

Please refer to FIG. 1. FIG. 1 is a flow chart of an image processing method disclosed by an embodiment of the present disclosure. The image processing method shown in FIG. 1 is applicable to a terminal device having a photo taking function, such as a smart mobile phone (Android mobile phone, iOS mobile phone, and the like), a tablet computer, a handheld computer, a mobile Internet device (MID), and a camera, which is not limited in the embodiments of the present disclosure. As shown in FIG. 1, the image processing method may include the following steps.

S101. Respond to an input first photographing instruction and photograph a first image including a first target object.

In the embodiment of the present disclosure, the terminal device may respond to an input first photographing instruction and photograph a first image including a first target object. The first target object included in the first image may be one or more persons, or may also be a view or an animal, which is not limited in the embodiment of the present disclosure.

S102. Perform transparency processing on the first image based on a preset transparency degree, so as to obtain an interface image having the preset transparency degree.

In the embodiment of the present disclosure, the terminal device may perform transparency processing on the first image based on a preset transparency degree, so as to obtain an interface image having the preset transparency degree. The preset transparency degree may be 10% to 20%.

In the embodiment of the present disclosure, the foregoing interface image having the preset transparency degree may be displayed on a view finding interface in the terminal device, and the foregoing interface image having the preset transparency degree does not displace with a change of a view finding direction of the terminal device, that is, the foregoing interface image having the preset transparency degree may be fixed displayed on the view finding interface of the terminal device.

S103. Respond to an input second photographing instruction and photograph a second image including a second target object as a background image.

In the embodiment of the present disclosure, the terminal device may respond to an input second photographing instruction and photograph a second image including a second target object as a background image. The second target object included in the background image may be one or more persons, or may also be a view or an animal, which is not limited in the embodiment of the present disclosure.

S104. Overlap the interface image having the preset transparency degree and the background image to obtain an overlapped image.

In the embodiment of the present disclosure, the terminal device may overlap the interface image having the preset transparency degree and the background image to obtain an overlapped image.

In the method shown in FIG. 1, a terminal device may respond to an input first photographing instruction and photograph a first image including a first target object (for example, a person), and perform transparency processing on the first image based on a preset transparency degree, so as to obtain an interface image having the preset transparency degree; and may respond to an input second photographing instruction and photograph a second image including a second target object (for example, a person) as a background image, and overlap the interface image having the preset transparency degree and the background image to obtain an overlapped image. In the method shown in FIG. 1, because the first target object and the second target object may both be a person, by implementing the method shown in FIG. 1, a group photo including everyone can be conveniently obtained, and the group photo may further be made more natural.

Figure 2:
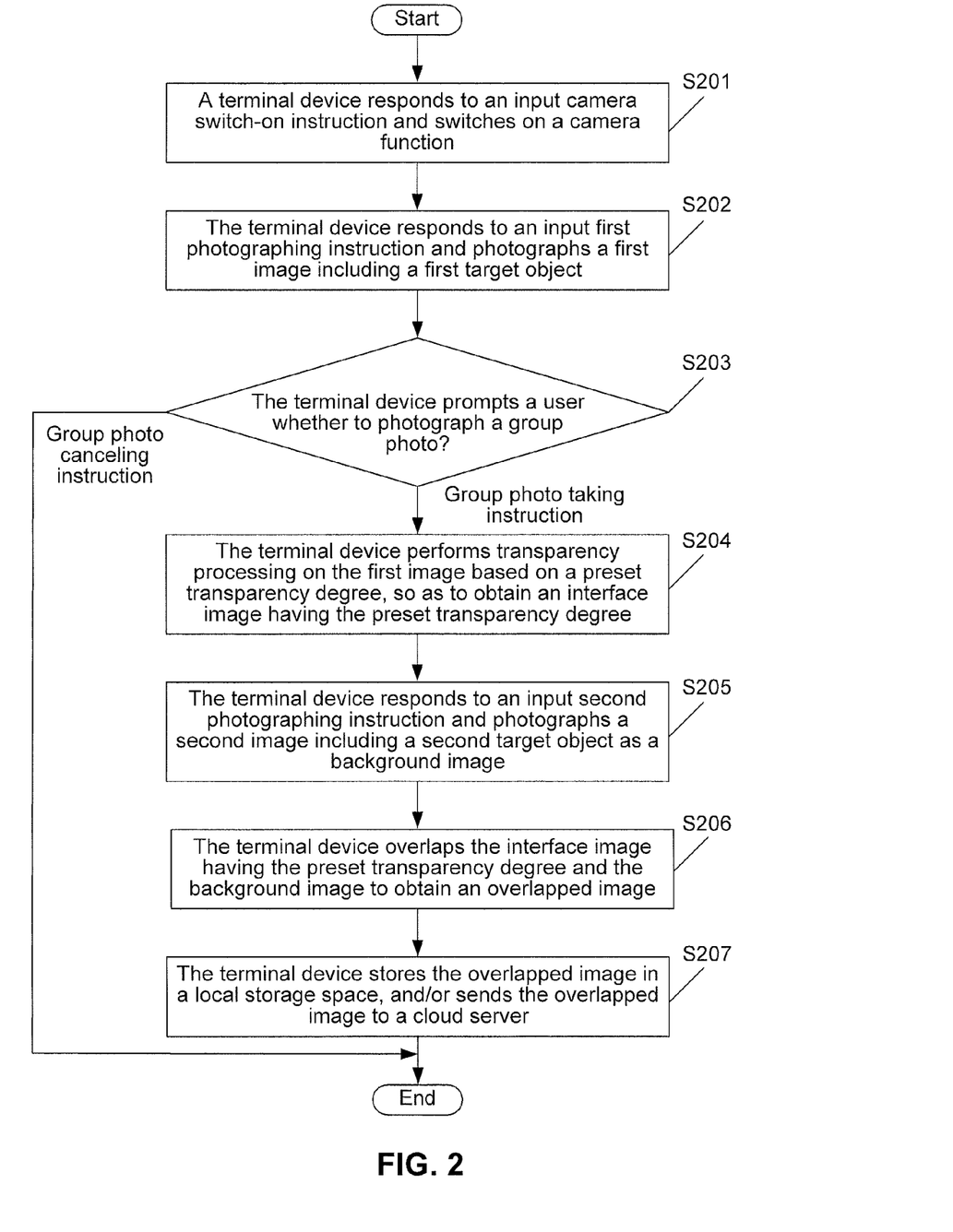
FIG. 2 is a flow chart of an image processing method disclosed by an embodiment of the present disclosure.

Please refer to FIG. 2. FIG. 2 is a flow chart of another image processing method disclosed by an embodiment of the present disclosure. The image processing method shown in FIG. 2 is applicable to a terminal device having a photo taking function, such as a smart mobile phone (Android mobile phone, iOS mobile phone, and the like), a tablet computer, a handheld computer, an MID, and a camera, which is not limited in the embodiments of the present disclosure. As shown in FIG. 2, the image processing method may include the following steps.

S201. The terminal device responds to an input camera switch-on instruction and switches on a camera function.

S202. The terminal device responds to an input first photographing instruction and photographs a first image including a first target object.

In the embodiment of the present disclosure, the terminal device may respond to an input first photographing instruction and photograph a first image including a first target object. The first target object included in the first image may be one or more persons, or may also be a view or an animal, which is not limited in the embodiment of the present disclosure.

S203. The terminal device prompts a user whether to photograph a group photo, if a group photo taking instruction input by the user is received, executes Step S204, and if a group photo canceling instruction input by the user is received, ends the process.

In the embodiment of the present disclosure, the terminal device may prompt a user whether to photograph a group photo in a speech or text manner, if a group photo taking instruction input by the user by using a relevant button (for example, an OK button) is received, execute Step S204, and if a group photo canceling instruction input by the user by using a relevant button (for example, a NO button) is received, end the process.

S204. The terminal device performs transparency processing on the first image based on a preset transparency degree, so as to obtain an interface image having the preset transparency degree.

In the embodiment of the present disclosure, the preset transparency degree may be 10% to 20%.

In the embodiment of the present disclosure, the foregoing interface image having the preset transparency degree may be displayed on a view finding interface in the terminal device, and the foregoing interface image having the preset transparency degree does not displace with a change of a view finding direction of the terminal device, that is, the foregoing interface image having the preset transparency degree may be fixed displayed on the view finding interface of the terminal device.

S205. The terminal device responds to an input second photographing instruction and photographs a second image including a second target object as a background image.

In the embodiment of the present disclosure, the second target object included in the background image may be one or more persons, or may also be a view or an animal, which is not limited in the embodiment of the present disclosure.

S206. The terminal device overlaps the interface image having the preset transparency degree and the background image to obtain an overlapped image.

In the embodiment of the present disclosure, the terminal device may overlap the interface image having the preset transparency degree and the background image to obtain an overlapped image.

Figure 3:
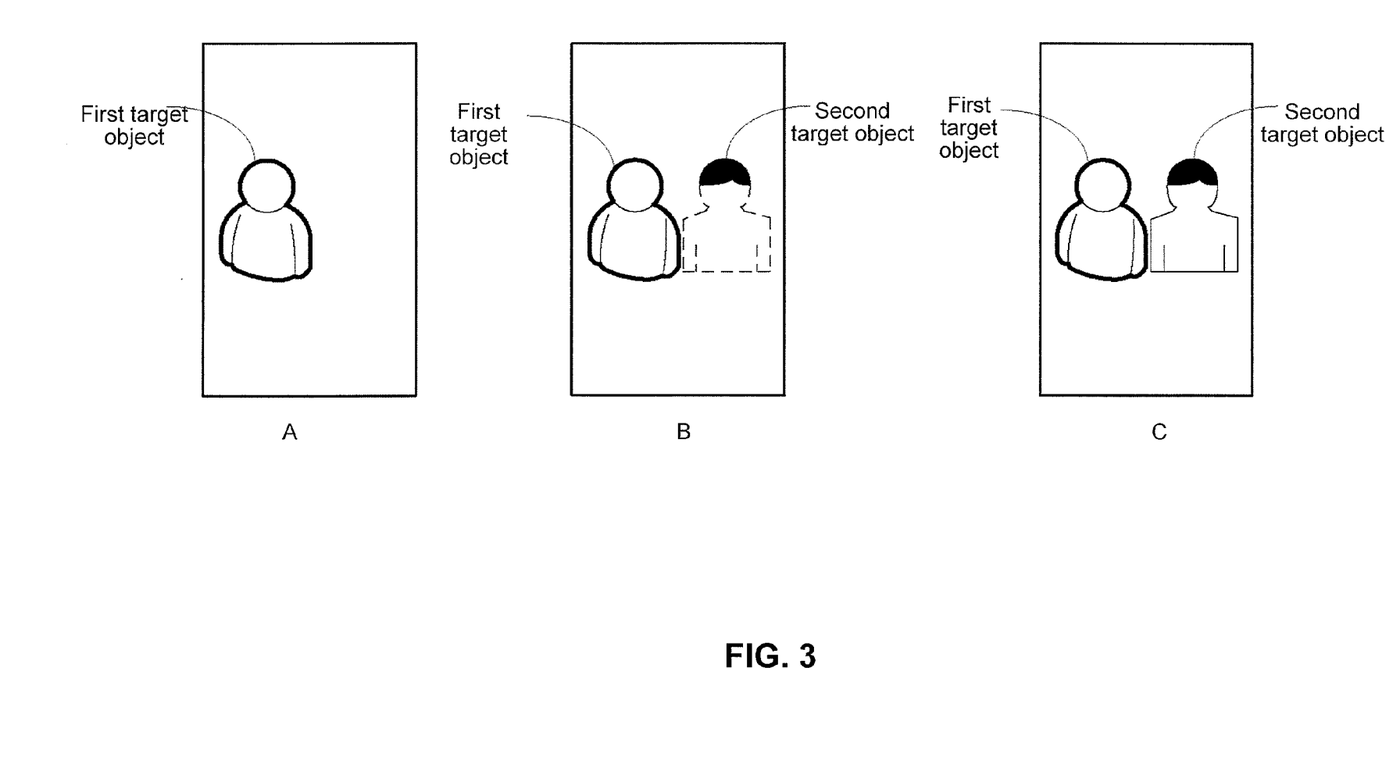
FIG. 3 is a schematic view of photo overlapping disclosed by an embodiment of the present disclosure.

For example, it is assumed that the terminal device performs transparency processing on the first image including the first target object based on the preset transparency degree, so as to obtain the interface image having the preset transparency degree denoted by A shown in FIG. 3. The terminal device responds to the input second photographing instruction and photographs to obtain the second image including the second target object denoted by B as shown in FIG. 3 as the background image (dotted lines denote the background). The terminal device may overlap the interface image having the preset transparency degree denoted by A shown in FIG. 3 and the background image denoted by B shown in FIG. 3, so as to obtain the overlapped image denoted by C shown in FIG. 3. Obviously, the overlapped image implements a group photo of the first target object and second target object.

S207. The terminal device stores the overlapped image in a local storage space, and/or sends the overlapped image to a cloud server.

In the method shown in FIG. 2, because the first target object and the second target object may both be a person, by implementing the method shown in FIG. 2, a group photo including everyone can be conveniently obtained, and the group photo may further be made more natural.

In the embodiment of the present disclosure, by implementing the method shown in FIG. 2, self-help group photo experience of "No one left out" may be implemented, thereby solving the problem that it is difficult to take a group photo, achieving "Ask no help to take a group photo", and making photographing more fun and interesting.

Figure 4:
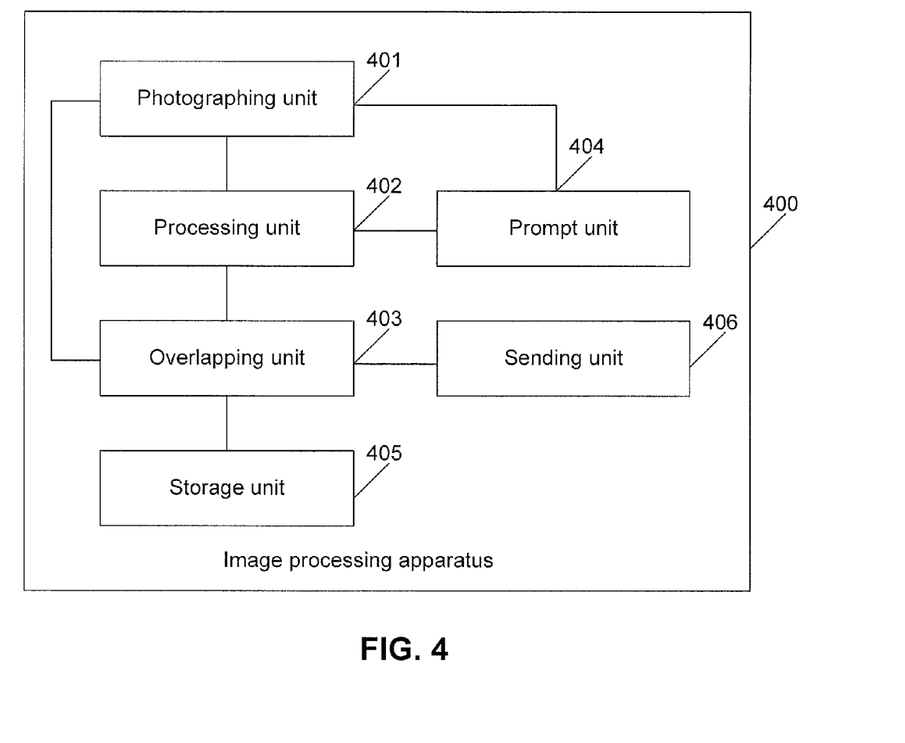
FIG. 4 is a structural diagram of an image processing apparatus disclosed by an embodiment of the present disclosure.

Please refer to FIG. 4. FIG. 4 is a structural diagram of an image processing apparatus disclosed by an embodiment of the present disclosure. The image processing apparatus shown in FIG. 4 is applicable to a terminal device having a photo taking function, such as a smart mobile phone (Android mobile phone, iOS mobile phone, and the like), a tablet computer, a handheld computer, an MID, and a camera, which is not limited in the embodiments of the present disclosure. As shown in FIG. 4, the image processing apparatus 400 may include:

a photographing unit 401, used to respond to an input first photographing instruction and photograph a first image including a first target object;

a processing unit 402, used to perform transparency processing on the first image photographed by the photographing unit 401 based on a preset transparency degree, so as to obtain an interface image having the preset transparency degree;

a photographing unit 401, further used to respond to an input second photographing instruction and photograph a second image including a second target object as a background image; and an overlapping unit 403, used to overlap the interface image having the preset transparency degree obtained by the processing unit 402 and the background image photographed by the photographing unit 401 to obtain an overlapped image.

As shown in FIG. 4, in the embodiment of the present disclosure, the photo photographing apparatus 400 further includes:

a prompt unit 404, used to prompt a user whether to photograph a group photo, if a group photo taking instruction input by the user is received, trigger the processing unit 402 to execute the step of performing transparency processing on the first image photographed by the photographing unit 401 based on the preset transparency degree, so as to obtain the interface image having the preset transparency degree.

In the embodiment of the present disclosure, after the photographing unit 401 responds to an input first photographing instruction and photographs a first image including a first target object, the prompt unit 404 prompts the user whether to photograph a group photo.

As shown in FIG. 4, in the embodiment of the present disclosure, the photo photographing apparatus 400 further includes:

a storage unit 405, used to store the overlapped image obtained by the overlapping unit 403 in a local storage space.

As shown in FIG. 4, in the embodiment of the present disclosure, the photo photographing apparatus 400 further includes:

a sending unit 406, used to send the overlapped image obtained by the overlapping unit 403 to a cloud server.

In the embodiment of the present disclosure, the preset transparency degree may be 10% to 20%.

In the apparatus shown in FIG. 4, because the first target object and the second target object may both be a person, by implementing the apparatus shown in FIG. 4, a group photo including everyone can be conveniently obtained, and the group photo may further be made more natural.

In the embodiment of the present disclosure, by implementing the apparatus shown in FIG. 4, self-help group photo experience of "No one left out" may be implemented, thereby solving the problem that it is difficult to take a group photo, achieving "Ask no help to take a group photo", and making photographing more fun and interesting.

Figure 5:
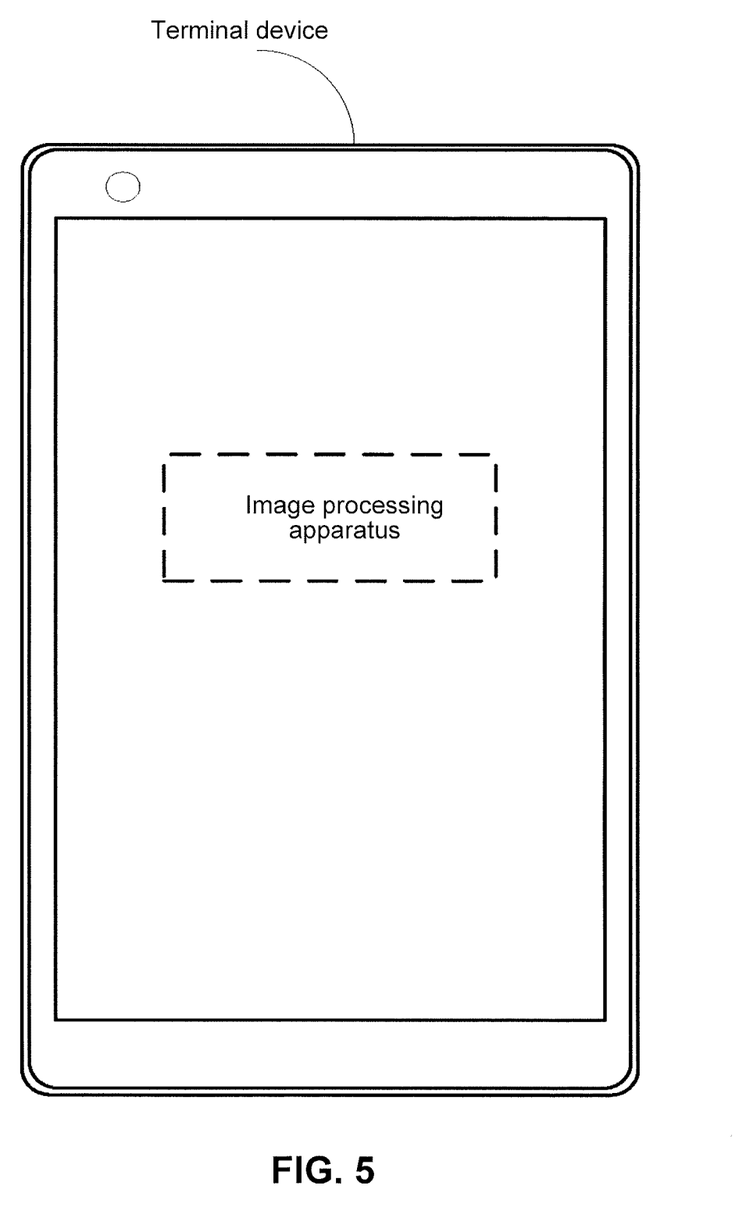
FIG. 5 is a structural diagram of a terminal device disclosed by an embodiment of the present disclosure.

Please refer to FIG. 5. FIG. 5 is a structural diagram of a terminal device disclosed by an embodiment of the present disclosure. The terminal device shown in FIG. 5 includes the image processing apparatus shown in FIG. 4. The terminal device shown in FIG. 5 can conveniently obtain a group photo including everyone and may further make the group photo more natural.

In the embodiment of the present disclosure, by implementing the terminal device shown in FIG. 5, self-help group photo experience of "No one left out" may be implemented, thereby solving the problem that it is difficult to take a group photo, achieving "Ask no help to take a group photo", and making photographing more fun and interesting.

Figure 6:
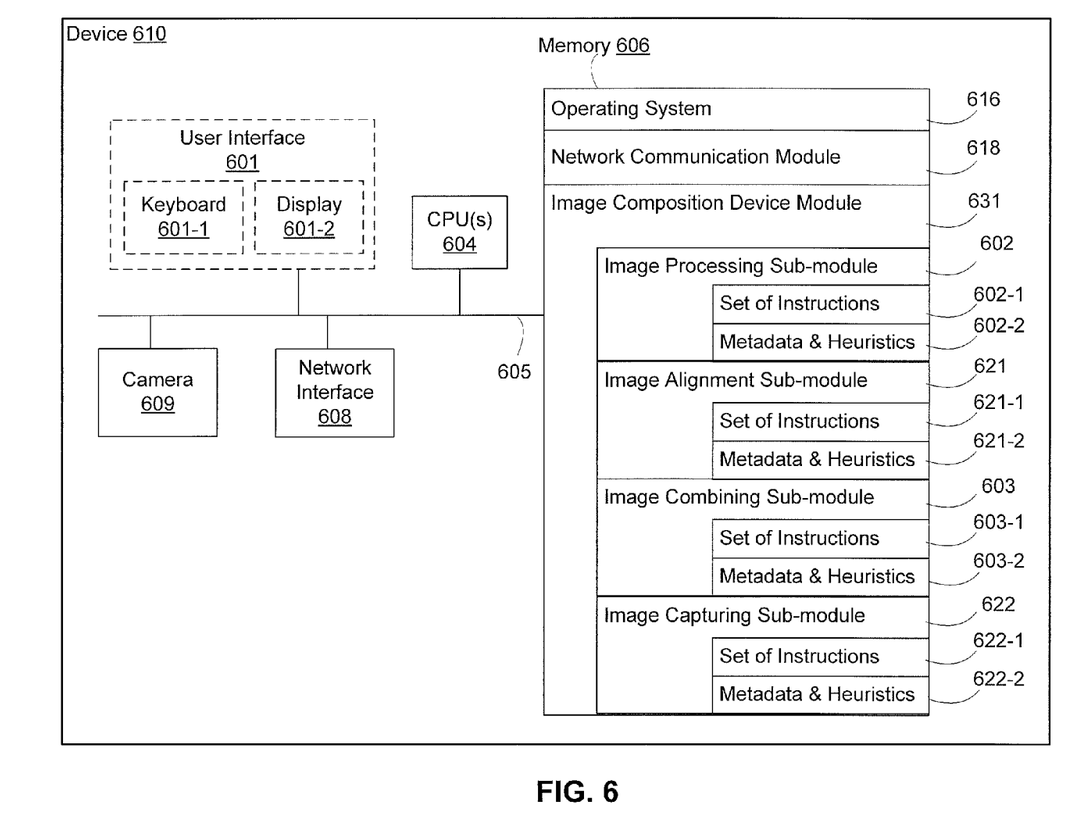
FIG. 6 is a block diagram of an exemplary client device for image processing in accordance with some embodiments.

FIG. 6 is a block diagram of an exemplary client device 610 for image processing in accordance with some embodiments. While certain specific features are illustrated, those skilled in the art will appreciate from the present disclosure that various other features have not been illustrated for the sake of brevity and so as not to obscure more pertinent aspects of the implementations disclosed herein.

Device 610 includes one or more processing units (CPU's) 604, one or more network or other communications interfaces 608, an optional user interface 601 (optionally comprising elements such as a keyboard 601-1 or display 601-2), memory 606, a camera 609 and one or more communication buses 605 for interconnecting these and various other components. The communication buses 605 may include circuitry (sometimes called a chipset) that interconnects and controls communications between system components. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 604. In some embodiments, memory 606, including the non-volatile and volatile memory device(s) within memory 606, comprises a non-transitory computer readable storage medium.

In some implementations, memory 606 or the non-transitory computer readable storage medium of memory 606 stores the following programs, modules and data structures, or a subset thereof including an operating system 616, a network communication module 618, and an image composition device module 631.

The operating system 616 includes procedures for handling various basic system services and for performing hardware dependent tasks.

The network communication module 618 facilitates communication with other devices (e.g., client devices 610), or optional image processing server systems via the one or more communication network interfaces 608 (wired or wireless) and one or more communication networks, such as the internet, other wide area networks, local area networks, metropolitan area networks, and so on.

In some implementations, the image composition device module 631 includes an image processing sub-module 602 for processing photographs (e.g., making a photograph transparent, extracting one or more portions from a photograph, using user feedback to make a photograph transparent, making a portion of a photograph a silhouette or changing the tone, color balance or contrast of a photograph) and generating processed photographs. To this end, the image processing sub-module 602 includes a set of instructions 602-1 and, optionally, metadata 602-2.

In some implementations, the image composition device module 631 includes an image alignment sub-module 621 having a set of instructions 621-1 (e.g., to align a processed photograph with a current photograph being taken) and, optionally, metadata 621-2, as well as an image combining sub-module 603 having a set of instructions 603-1 (e.g., for combining elements of a processed photograph and a current photograph being taken) and optionally metadata 603-2. In some implementations, the image composition device module 631 includes an image capturing sub-module 622 having a set of instructions 622-1 (e.g., for capturing or taking a photograph) and, optionally, metadata 622-2. In some embodiments, the image composition device module 631 also includes other modules to perform the functions of the server described with respect to FIGS. 9A-9B.

Figure 7:
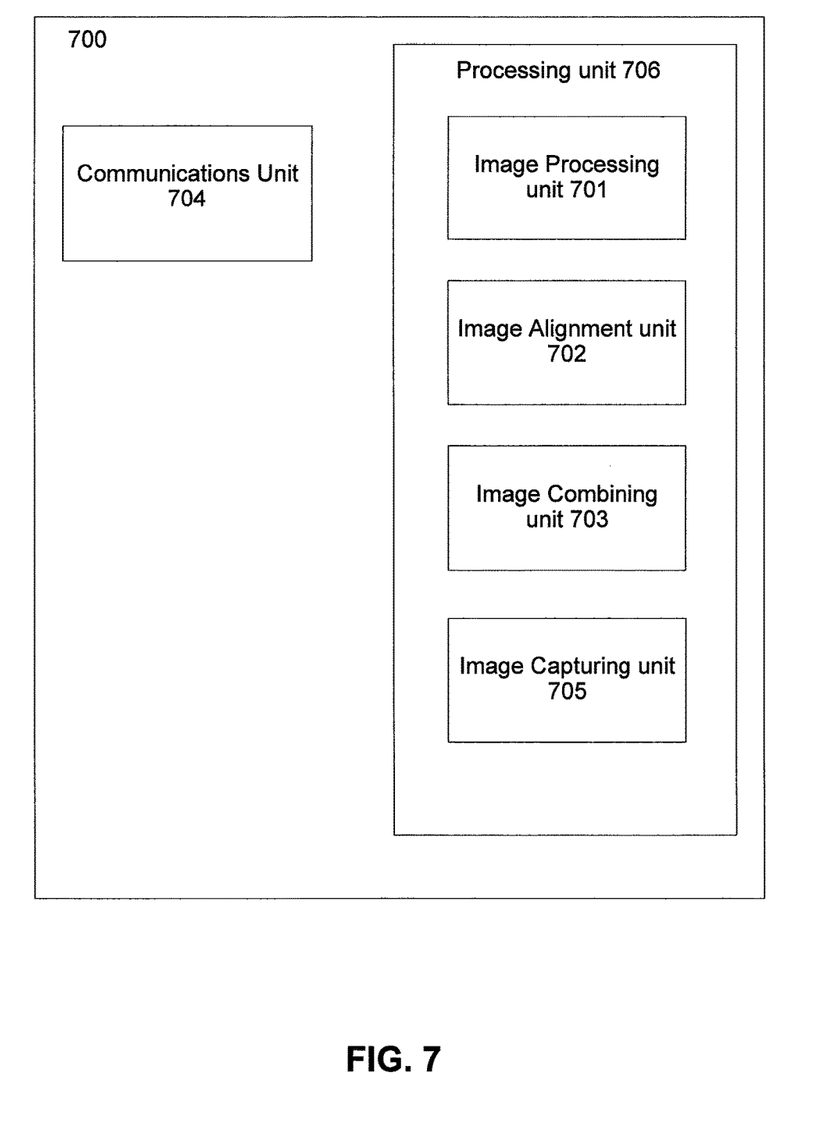
FIG. 7 is a block diagram of an apparatus of image processing in accordance with some embodiments.

FIG. 7 is a block diagram of a realization apparatus 700 of image processing at a client device in accordance with some implementations of the present application.

As is shown in FIG. 7, this device includes: a communications unit 704, and a processing unit 706 comprising an image processing unit 701, image alignment unit 1902, image combining unit 703, and image capturing unit 705, among which:

Image processing unit 701: configured for processing photographs (e.g., making a photograph transparent, extracting one or more portions from a photograph, using user feedback to make a photograph transparent, making a portion of a photograph a silhouette or changing the tone, color balance or contrast of a photograph);

Image alignment unit 702: configured to align a processed photograph with a current photograph being taken;

Image combining unit 703: configured to combine elements of a processed photograph and a current photograph being taken;

Image capturing unit 705: configured to capture or take a photo; and

Communications unit 704 is configured to send and receive communications (e.g., client device 610 to and from other client devices 610).

Figure 9A:
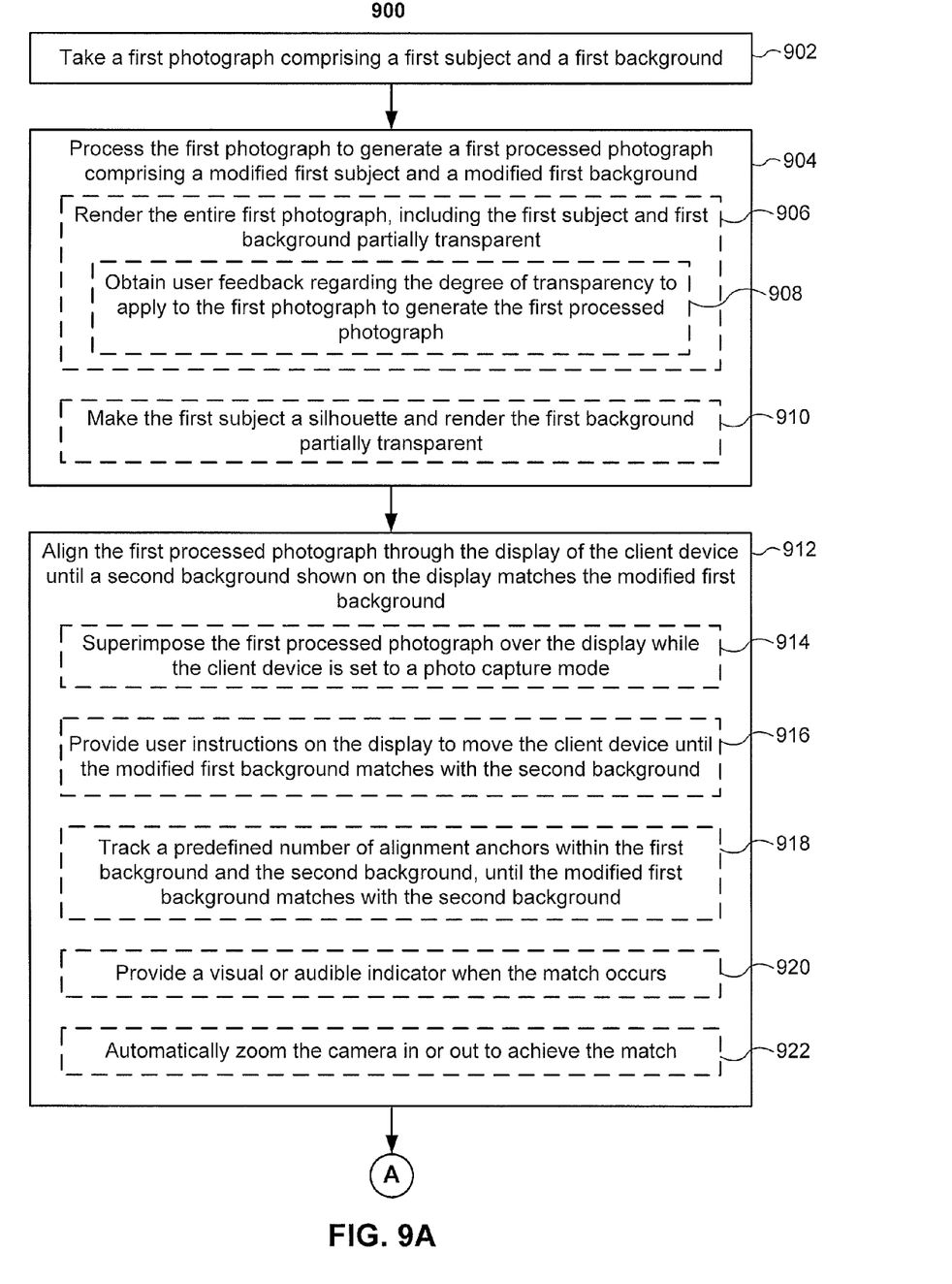
FIGS. 9A-9B are a flow chart of a method of image processing, in accordance with some embodiments.
Figure 9B:
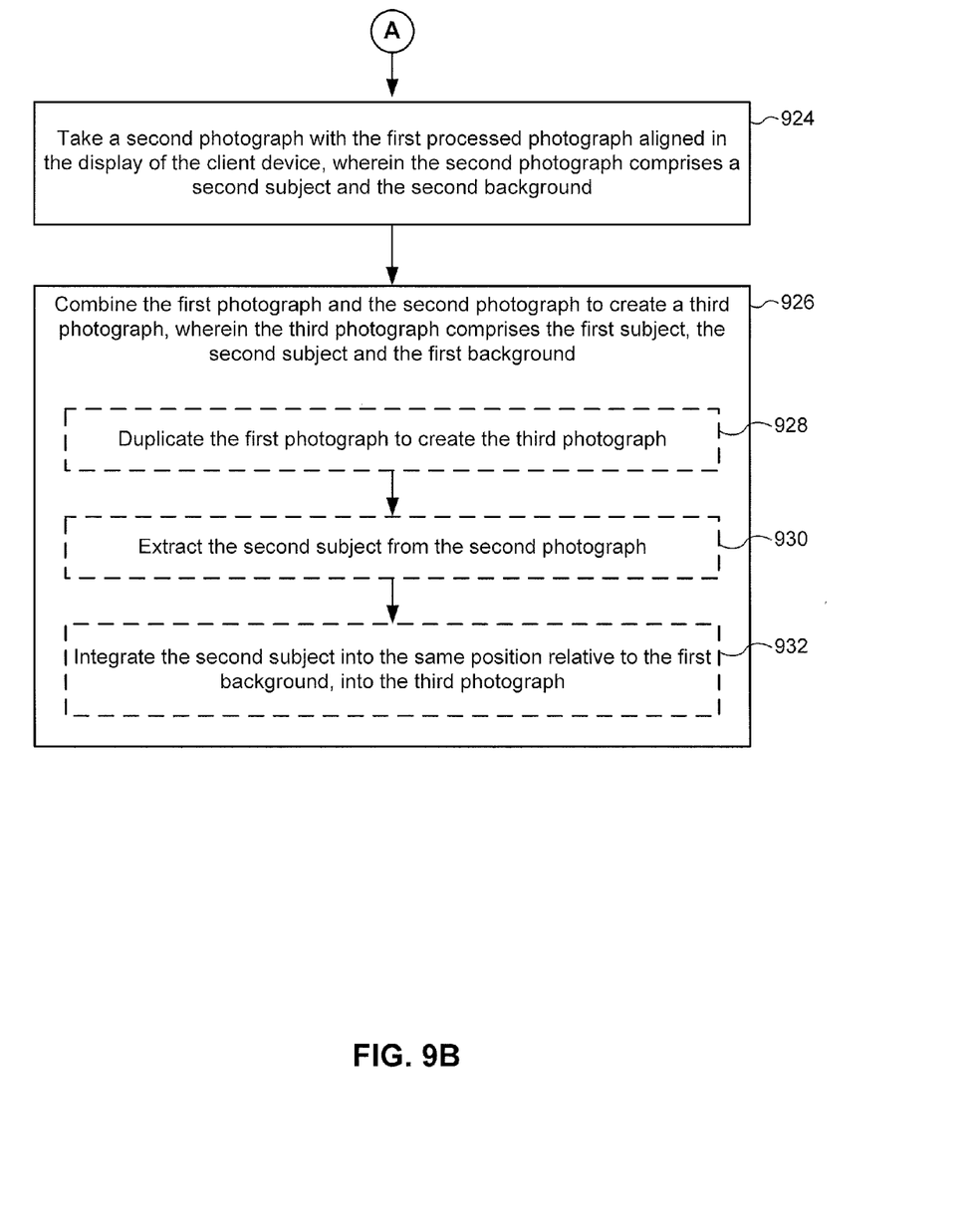

In some embodiments, the realization apparatus 700 also includes other sub-units to perform the functions of the client device described with respect to FIGS. 9A-9B.

It is acceptable to integrate the device shown in FIG. 7 into hardware entities of a variety of networks. For example, the realization device for image processing is allowed to be integrated into: server systems including mainframes, PC computers, portable electronic devices, commercial/enterprise servers etc.

Figure 8:
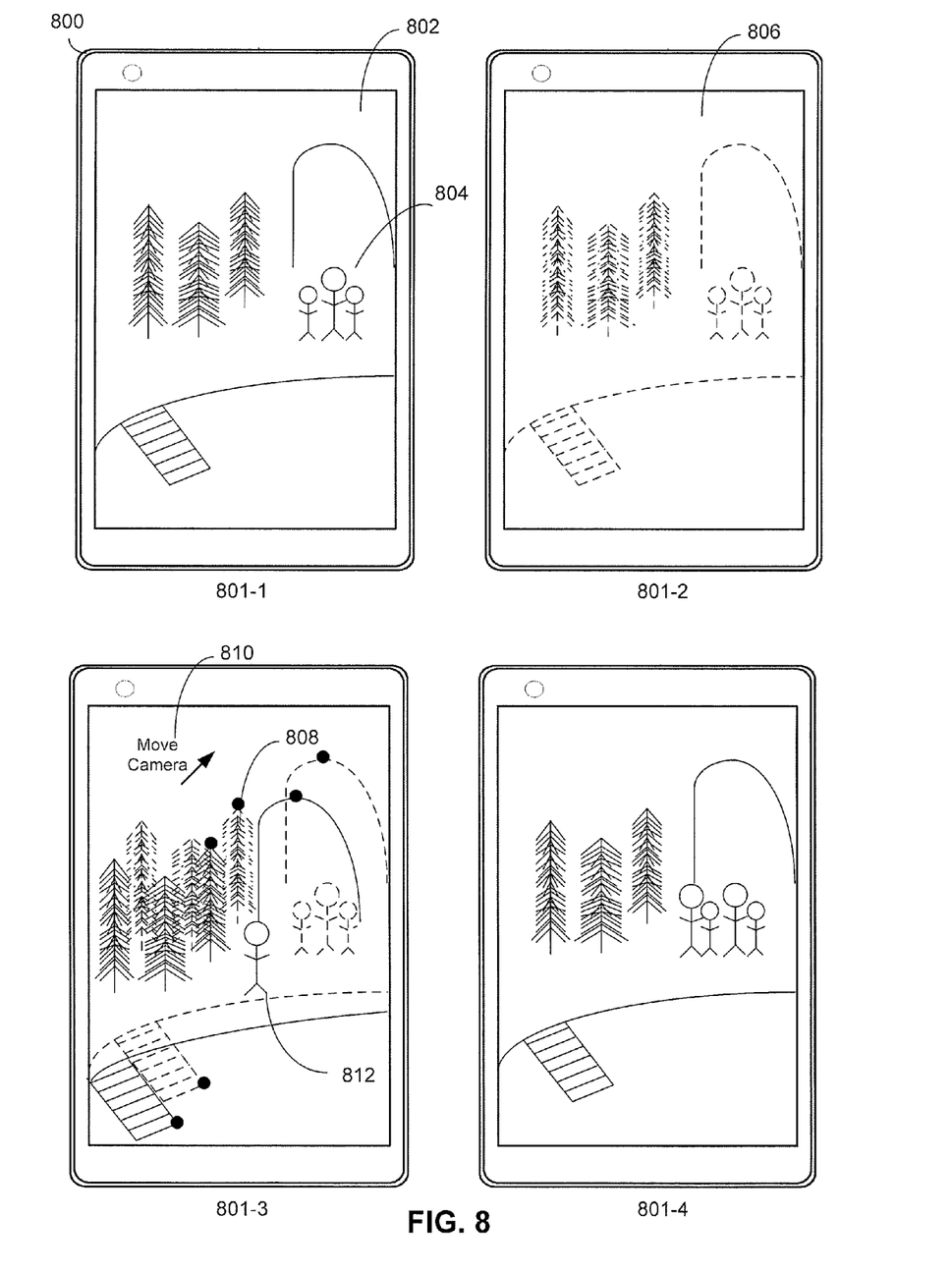
FIG. 8 is a set of user interfaces illustrating a method of image processing in accordance with some embodiments.

FIG. 8 is a set of user interfaces 801 illustrating a method of image processing in accordance with some embodiments. FIG. 8 shows four user interfaces on client device 800. In user interface 801-1, a first photograph is taken with a first background 802 and a first subject 804 (e.g., a group of three people excluding the photographer). In user interface 801-2 a first processed photograph 806 is displayed. In some embodiments, first processed photograph 806 is displayed in response to detecting or receiving a request to generate an image composition. In some embodiments, the first processed photograph is a transparent version of the first photograph. In some embodiments, the degree of transparency of the first processed photograph is user defined (e.g., the user of client device 800 can set how transparent the first processed photograph is). User interface 801-3 shows the first processed photograph with a current photograph to be taken. User interface 801-3 shows that in some embodiments, alignment points 808 are displayed or used by the client device to align the current photograph to be taken, with the first processed photograph. User interface 801-3 also shows user instructions 810 directing the user to move the camera to align the current photograph being taken with the first processed photograph. The current photograph to be taken includes a second subject 812 (e.g., the photographer of the first photograph, and the subject to be combined into the image composition). User interface 801-4 shows the result of combining the first photograph (or a portion of the first photograph), with a second photograph taken after the first processed photograph and the photograph being taken in user interface 801-3 are aligned. User interface 801-4 shows the first background 802, the first subject 804 and the second subject 812 merged into one.

FIGS. 9A-9B are a flow chart of a method 900 of image processing, in accordance with some embodiments. The method includes taking (902) a first photograph comprising a first subject and a first background (e.g., as shown in user interface 801-1, FIG. 8). The method further includes processing (904) the first photograph to generate a first processed photograph comprising a modified first subject and a modified first background. In some embodiments, processing the first photograph includes rendering (906) the entire first photograph, including the first subject and first background partially transparent. In some embodiments, rendering the entire first photograph partially transparent includes obtaining (908) user feedback regarding the degree of transparency to apply to the first photograph to generate the first processed photograph. In some embodiments, processing the first photograph includes making (910) the first subject a silhouette and rendering the first background partially transparent.

The method further includes aligning (912) the first processed photograph through the display of the client device until a second background shown on the display matches the modified first background. In some embodiments, aligning includes superimposing (914) the first processed photograph over the display while the client device is set to a photo capture mode (e.g., as shown in user interface 801-3, FIG. 8). In some embodiments, aligning includes providing (916) user instructions on the display to move the client device until the modified first background matches with the second background (e.g., instructions 810, FIG. 8). In some embodiments, aligning includes tracking (918) a predefined number of alignment anchors within the first background and the second background, until the modified first background matches with the second background (e.g., alignment points 808, FIG. 8). In some embodiments, aligning includes providing (920) a visual or audible indicator when the match occurs. For example, a picture of a lock briefly appears, the edges of the screen glow or a border appears, a click or other sound is heard. In some embodiments, aligning includes automatically zooming (922) the camera in or out to achieve the match. For example, if the second photographer is too far or too close to the second background, the client device zooms the camera in or out until alignment occurs. In some embodiments, aligning includes cropping a portion of the image shown on the display (e.g., along an edge of the image) until alignment occurs.

The method further includes taking (924) a second photograph with the first processed photograph aligned in the display of the client device, wherein the second photograph comprises a second subject and the second background. The method further includes combining (926) the first photograph and the second photograph to create a third photograph, wherein the third photograph comprises the first subject, the second subject and the first background. In some embodiments, combining the first photograph and the second photograph to create a third photograph includes duplicating (928) the first photograph to create the third photograph, extracting (930) the second subject from the second photograph and integrating (932) the second subject into the same position relative to the first background, into the third photograph. In some embodiments, integrating includes adjusting the relative size of the second subject, blending edges of the second subject or adjusting color balance/tone/brightness of second subject.

A person of ordinary skill in the art may understand that, all or a part of the steps of the methods in the foregoing embodiments may be implemented by a program instructing hardware relevant to a terminal device. The program may be stored in a computer readable storage medium of the terminal device. The storage medium may include: a flash drive, a Read-Only Memory (ROM), a Random Access Memory (RAM), a magnetic disk or an optical disc.

An image processing method and apparatus and a terminal device disclosed by the embodiments of the present disclosure are introduced in detail above. The principle and implementation of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

While particular embodiments are described above, it will be understood it is not intended to limit the disclosure to these particular embodiments. On the contrary, the disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the disclosure herein is for the purpose of describing particular embodiments only and is not intended to be limiting of the disclosure. As used in the description of the disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A method for performing image processing at a client device having a camera, display, one or more processors, and memory for storing programs to be executed by the client device, comprising:
    taking, via the camera, a first photograph comprising a first subject and a first background;
    processing the first photograph to: (i) generate a first processed photograph comprising a modified first subject and a modified first background, and (ii) extract a plurality of alignment anchors from the modified first background;
    displaying the first processed photograph on the display of the client device, and while displaying the first processed photograph:
        aligning the first processed photograph through the display of the client device with a second background also shown on the display by comparing the plurality of alignment anchors extracted from the modified first background with a plurality of equivalent alignment anchors extracted from the second background;
        providing a visual or audible indicator upon determining that the plurality of alignment anchors extracted from the modified first background is matched with the plurality of equivalent alignment anchors extracted from the second background; and
        taking, via the camera, a second photograph with the first processed photograph aligned in the display of the client device, wherein the second photograph comprises a second subject and the second background; and
    combining the first photograph and the second photograph to create a third photograph, wherein the third photograph comprises the first subject, the second subject, and the first background.

2. The method of claim 1, wherein processing the first photograph to generate the first processed photograph includes rendering the first photograph in its entirety, including the first subject and first background, semi-transparent.

3. The method of claim 1, wherein rendering the entire first photograph partially transparent includes obtaining user feedback regarding the degree of transparency to apply to the first photograph to generate the first processed photograph.

4. The method of claim 1, wherein processing the first photograph includes making the first subject a silhouette and rendering the first background semi-transparent.

5. The method of claim 1, wherein aligning the first processed photograph through the display includes superimposing the first processed photograph over the display while the client device is set to a photo capture mode.

6. The method of claim 1, wherein aligning the first processed photograph through the display includes providing user instructions on the display to move the client device until the plurality of alignment anchors extracted from the modified first background is matched with the plurality of equivalent alignment anchors extracted from the second background.

7. The method of claim 1, wherein aligning the first processed photograph through the display includes zooming, by the one or more processors, the camera in or out to match the plurality of alignment anchors extracted from the modified first background with the plurality of equivalent alignment anchors extracted from the second background.

8. The method of claim 1, wherein combining the first photograph and the second photograph to create the third photograph includes:
    duplicating the first photograph to create the third photograph;
    extracting the second subject from the second photograph; and
    integrating the second subject into the same position relative to the first background, into the third photograph.

9. A client device, comprising:
    one or more processors;
    a camera;
    a display; and
    memory having instructions stored thereon, the instructions, when executed by the one or more processors, cause the processors to perform operations comprising:
        taking, via the camera, a first photograph comprising a first subject and a first background;
        processing the first photograph to: (i) generate a first processed photograph comprising a modified first subject and a modified first background, and (ii) extract a plurality of alignment anchors from the modified first background;
        displaying the first processed photograph on the display of the client device, and while displaying the first processed photograph:
            aligning the first processed photograph through the display of the client device with a second background also shown on the display by comparing the plurality of alignment anchors extracted from the modified first background with a plurality of equivalent alignment anchors extracted from the second background;
            providing a visual or audible indicator upon determining that the plurality of alignment anchors extracted from the modified first background is matched with the plurality of equivalent alignment anchors extracted from the second background; and
            taking, via the camera, a second photograph with the first processed photograph aligned in the display of the client device, wherein the second photograph comprises a second subject and the second background; and
        combining the first photograph and the second photograph to create a third photograph, wherein the third photograph comprises the first subject, the second subject and the first background.

10. The client device of claim 9, wherein processing the first photograph to generate the first processed photograph includes rendering the first photograph in its entirety, including the first subject and first background, semi-transparent.

11. The client device of claim 9, wherein processing the first photograph includes making the first subject a silhouette and rendering the first background semi-transparent.

12. The client device of claim 9, wherein aligning the first processed photograph through the display includes superimposing the first processed photograph over the display while the client device is set to a photo capture mode.

13. The client device of claim 9, wherein aligning the first processed photograph through the display includes providing user instructions on the display to move the client device until the plurality of alignment anchors extracted from the modified first background is matched with the plurality of equivalent alignment anchors extracted from the second background.

14. The client device of claim 9, wherein aligning the first processed photograph through the display includes zooming, by the one or more processors, the camera in or out to match the plurality of alignment anchors extracted from the modified first background with the plurality of equivalent alignment anchors extracted from the second background.

15. The client device of claim 9, wherein combining the first photograph and the second photograph to create the third photograph includes:

duplicating the first photograph to create the third photograph;

extracting the second subject from the second photograph; and integrating the second subject into the same position relative to the first background, into the third photograph.

16. A non-transitory computer-readable storage medium storing one or more programs, the one or more programs comprising instructions, which when executed by a client device having a display and a camera, cause the client device to:

take, via the camera, a first photograph comprising a first subject and a first background;

process the first photograph to: (i) generate a first processed photograph comprising a modified first subject and a modified first background, and (ii) extract a plurality of alignment anchors from the modified first background;

display the first processed photograph on the display of the client device, and while displaying the first processed photograph:

align the first processed photograph through the display of the client device with a second background also shown on the display by comparing the plurality of alignment anchors extracted from the modified first background with a plurality of equivalent alignment anchors extracted from the second background;

provide a visual or audible indicator upon determining that the plurality of alignment anchors extracted from the modified first background is matched with the plurality of equivalent alignment anchors extracted from the second background; and take, via the camera, a second photograph with the first processed photograph aligned in the display of the client device, wherein the second photograph comprises a second subject and the second background; and combine the first photograph and the second photograph to create a third photograph, wherein the third photograph comprises the first subject, the second subject, and the first background.

* * * * *